June 4, 1940. A. J. SNOW Re. 21,480

RADIO RECEIVER

Original Filed July 6, 1936 2 Sheets-Sheet 1

Inventor
Adolph J. Snow
By Frank H. Marks,
Atty.

June 4, 1940. A. J. SNOW Re. 21,480
RADIO RECEIVER
Original Filed July 6, 1936 2 Sheets-Sheet 2
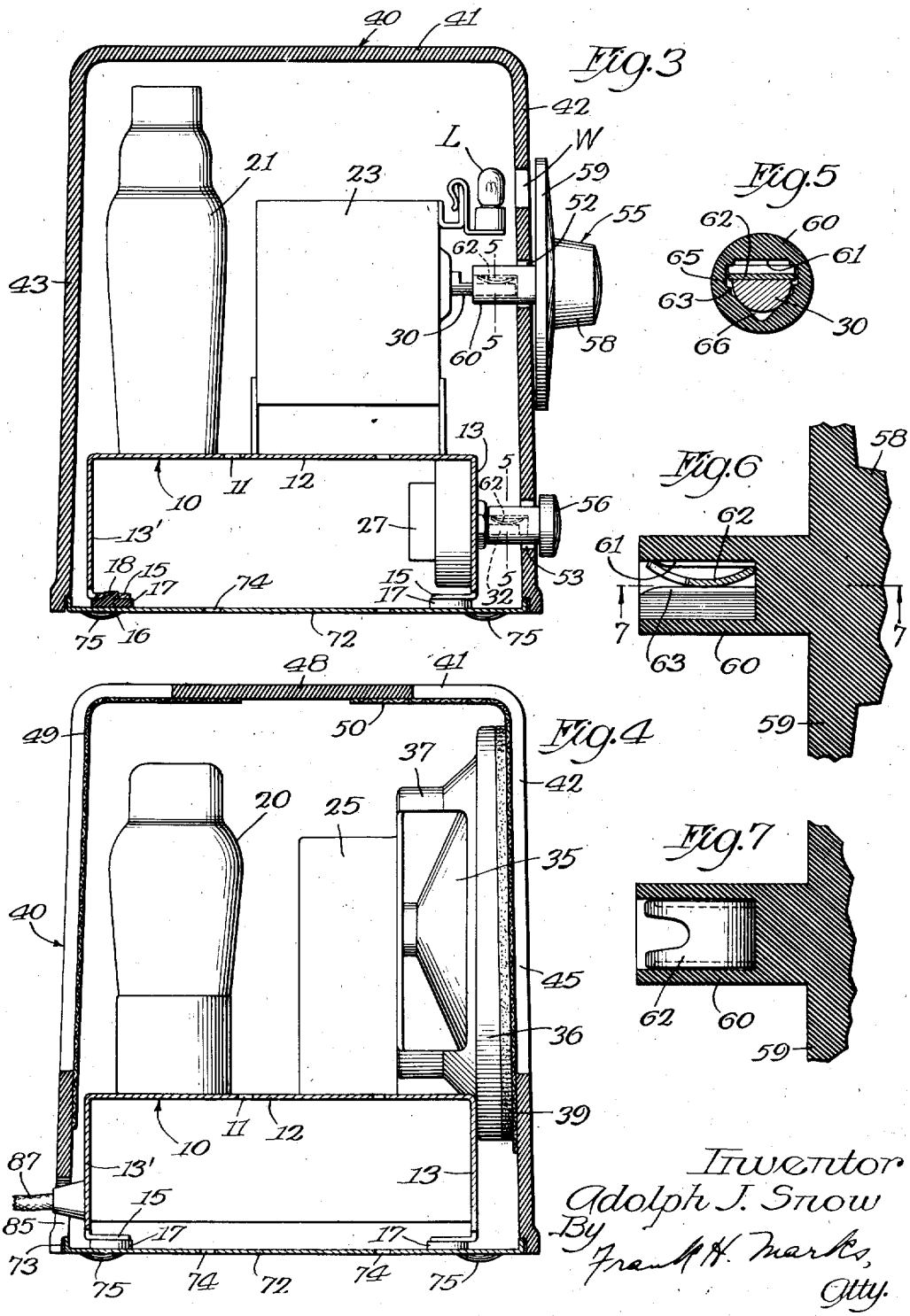

Reissued June 4, 1940

Re. 21,480

UNITED STATES PATENT OFFICE 21,480

RADIO RECEIVER

Adolph J. Snow, Wilmette, Ill., assignor to Sears, Roebuck and Co., Chicago, Ill., a corporation of New York Original No. 2,108,729, dated February 15, 1938, Serial No. 89,016, July 6, 1936. Application for reissue September 29, 1939, Serial No. 297,196

12 Claims. (Cl. 250—14)

My invention relates to radio receiving sets and has to do more particularly with a set having an improved housing completely inclosing the set and consisting essentially of a molded member and a closure plate.

An object of my invention is to provide a radio receiver and cabinet therefor of molded construction which may be produced economically by means of simple, inexpensive dies and of such design that said cabinet may be quickly assembled with the receiver, thus involving a minimum of labor cost.

A further object of my invention is to provide a radio receiver cabinet of the type referred to combining an attractive appearance with adequate strength to meet all requirements. My invention is especially applicable to so-called table models.

Still another object is to provide a receiver having a cabinet provided with substantial open areas in the front, top and rear walls thereof adjacent the amplifier or speaker, for the purpose of producing improved tone quality regardless of the position of the listener relative to the set. This feature is of great importance in a table model, since the set may be placed toward the center of a room with listeners on various sides of the set.

Numerous other objects and advantages will become apparent as the description proceeds.

Referring now to the drawings forming a part of this specification and illustrating a preferred embodiment of my invention:

Fig. 3 is a sectional view taken substantially along the line 3—3 of Fig. 2;

Fig. 4 is a section along the line 4—4 of Fig. 2;

Fig. 5 is a sectional view along the line 5—5 of Fig. 3;

Fig. 6 is a fragmentary axial sectional view on an enlarged scale of a dial forming a part of my invention; and Fig. 7 is a sectional view along the line 7—7 of Fig. 6.

Figure 1:
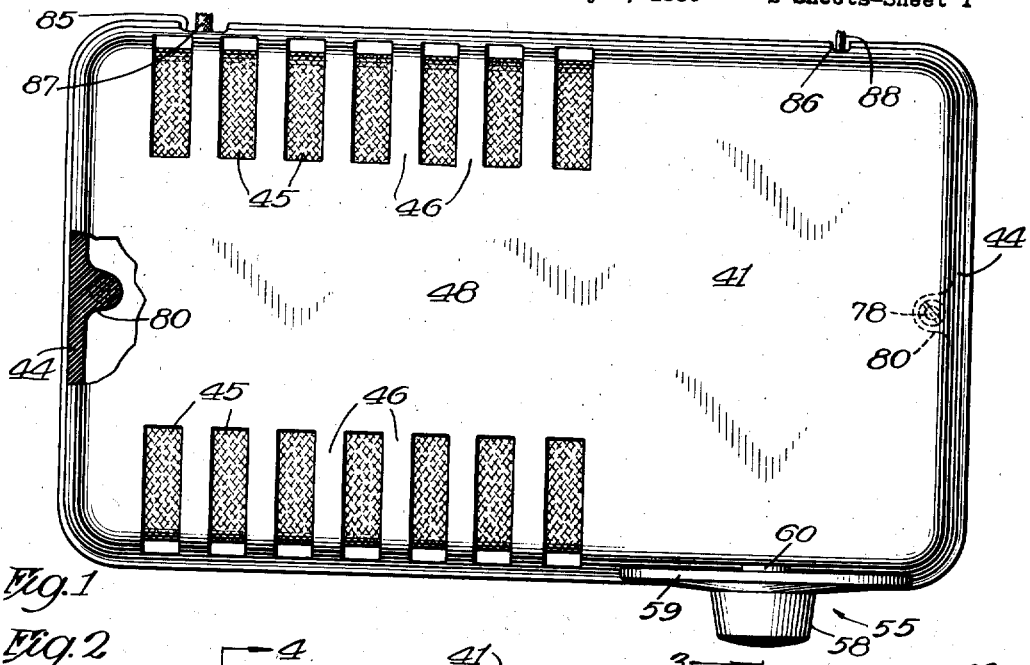
Fig. 1 is a top plan view of a radio receiver and cabinet embodying my invention.

Referring first to Figs. 3 and 4, the radio receiver comprises a support represented generally by the numeral 10, which may be formed of stiff metal or other suitable material, and perforated at numerous points 11 for ventilation. The support 10 comprises a platform 12, a pair of front and rear supporting walls 13 and 13′ constituting legs, said legs having integral inwardly turned feet 15 adjacent the ends thereof. Said feet 15 may be perforated for the seating of resilient cushions 17 of soft rubber or the like, said cushions having integral studs 18 frictionally seating in the perforations of feet 15.

As will be readily understood by those skilled in the art, the support 10 serves for the mounting of the various functional elements of the radio receiver such as tubes 20 and 21, a variable condenser 23, an amplifier or loud speaker unit 25, switch and resistance elements indicated generally by the numeral 27, etc. These elements need not be described in any detail since my invention is not restricted to any particular design of receiver.

The variable condenser 23 is controlled by means of a spindle 30 which, as seen clearly in Fig. 5 is of semi-circular cross section while the switch and resistance element 27 controlled by a spindle 32 of similar cross section.

The amplifier 25 is provided with a cone 35 of any suitable design which is supported by a circular frame 36 having an integral spider 37. The circular frame 36 carries on its outer face an annular gasket 39 of felt or the like.

Figure 2:
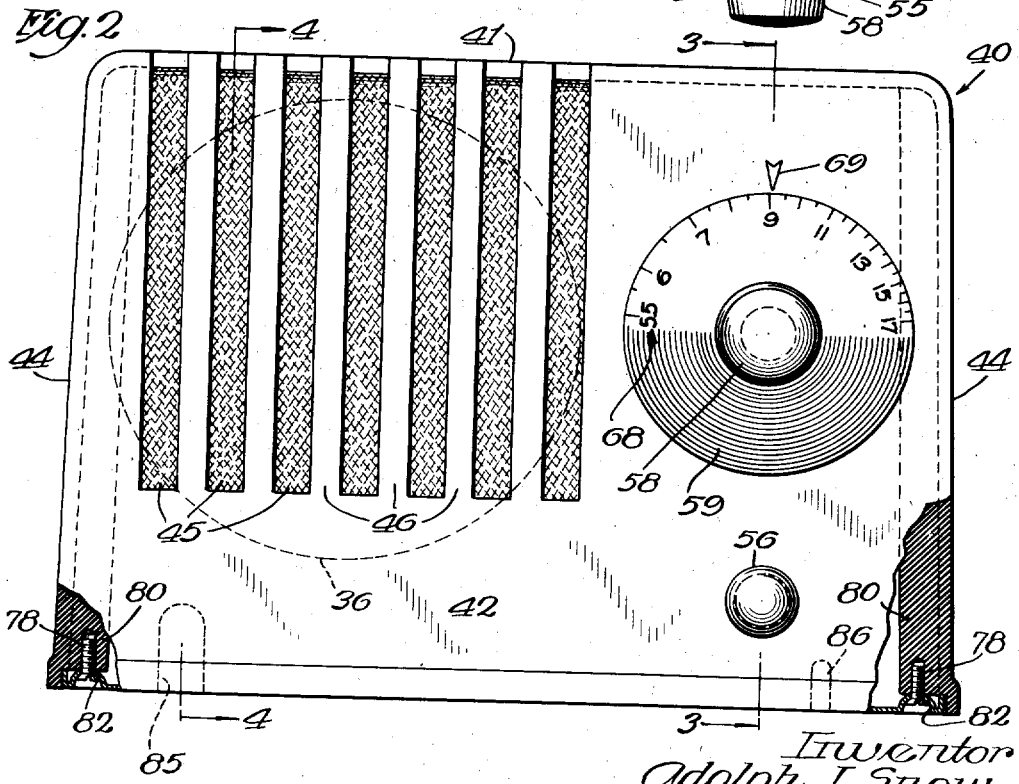
Fig. 2 is a front elevation thereof.

The receiver just described is housed within a cabinet indicated generally by the numeral 40. This cabinet, in accordance with my invention, is molded out of any suitable material, such as hard rubber, Bakelite (phenolformaldehyde condensation resins) or other plastic suitable for the purpose. Said cabinet comprises a top wall 41, a front wall 42, a rear wall 43, and side walls 44, 44. The cabinet adjacent the amplifier or speaker is substantially open at the front, rear and top as seen clearly in Figs. 1 and 2, being provided with relatively long and narrow slots or openings 45 which extend along the front and rear walls of the cabinet and at least partially across the top thereof as seen in Fig. 1. Between the openings 45 are webs 46 integral with the cabinet for reinforcing the cabinet adjacent said openings 45 while the top of the cabinet is preferably reinforced between the openings 45 by the integral panel 48 which extends between the slots 45 of the front and rear walls. The openings 45 are backed by suitable mesh fabric 49, 50, as seen in Fig. 4, which may be secured to the inside of the cabinet by means of adhesive or the like.

While the openings of the front, rear, and top walls may be protected by grille work of other design, it is found that the elongated ribs 46 lend themselves especially well to a molded type of cabinet.

Apertures 52 and 53 are provided in the front wall 42 of the cabinet 40 through which extend a tuning dial 55 and a combined switch and volume control knob 56.

The tuning dial, which is clearly shown in Figs. 3, 5, 6 and 7 and which may conveniently be formed of molded material, comprises a knob or handle portion 58, a disk portion 59 and a stud portion 60. The stud portion 60 is bored to provide a substantially flat seat 61 against which is disposed a leaf spring 62 which is retained by means of shoulders 63 formed on the walls 65.

Opposite the flat face 61 the bore is substantially V-shaped as shown at 66 (Fig. 5). If desired, the dial, or, at any rate, the disk portion 59 bearing the indicia for station selection, may be formed of translucent material and an electric lamp L may be mounted therebehind and arranged to be lighted when the receiver switch is snapped on, so that the receiver may be tuned in a dark room. A suitable window W in the front wall of the cabinet may be provided for this purpose.

As will be clearly seen, the tuning dial may be quickly attached and detached frictionally to or from the spindle 30.

The dial may be provided with tuning indicia 68 (Fig. 2) while a datum point 69 may be provided in the cabinet by molding the same therein either in relief or in intaglio. Of course, if desired, the indicia may be arranged on the cabinet and a pointer or the like arranged on the tuning dial.

The combined switch and volume control knob 56 is also preferably molded and may be constructed similarly to the tuning dial 55, so far as concerns its means of attachment to the spindle 32, and hence said knob need not be further described.

The molded cabinet 40 is closed by a base plate 72 which may be conveniently stamped out of metal or other suitable material. Said base plate is provided with a marginal upstanding flange 73 which seats against a rectangular shoulder provided in the lower inside edge of the cabinet 40 as shown clearly in Figs. 3 and 4, and is provided with a plurality of perforations 74 for ventilation. The closure plate may have formed therein a plurality of outwardly extending dimples 75, said dimples serving as feet for raising the device above the surface on which it is supported, thus facilitating ventilation. The base plate may be secured to the molded cabinet 40 by means of screws 78 which engage threaded openings provided on the inside of the cabinet wall. For this purpose the end walls 44, 44 of the molded cabinet (Figs. 1 and 2) may be provided with integral columns 80 of approximately cylindrical shape and extending inwardly from said side walls, the lower ends of said columns being tapped to provide female threads for engaging the screws 78. Locking washers 82 may be provided for retaining the screws 78.

The molded cabinet 40 is also preferably provided adjacent the bottom of the rear wall 43 thereof with a pair of openings 85, 86 in order to permit the passage, respectively, of an electrical cable 87 for connecting the receiver to a light socket or other source of current and of an antenna or ground wire 88.

As an alternative construction, the receiver chassis may be directly attached to the molded cabinet and the latter resiliently secured to the base plate, in any suitable manner.

It will be seen that I have provided a receiving set which is extremely simple and compact. Thus, the cabinet consists essentially of a single molded member constituting the front, rear, top and side walls, completely housing the set with the closure plate 72. It will be seen that the operation of assembly is reduced to the utmost simplicity. The only steps that are required are as follows: The receiver is arranged on the base plate 72, the molded cabinet 40 is slipped over said unit, the tuning dial 55 and knob 56 are snapped frictionally into engagement with the spindles 30 and 32, respectively, and the base plate is secured by means of the screws 78. The felt gasket 39 permits the speaker cone to fit snugly against the front wall of the cabinet, reducing jarring of said cone.

A further advantage according to my invention is that the molded cabinet may be made very economically by means of the simplest type of molds, consisting essentially of a male and a female member, thus lowering the cost of manufacture. The grille work shown herein is especially adapted to this kind of molding.

By providing the large open areas in the front, rear and top of the cabinet, I have found that a superior tone quality is produced on all sides of the set. The open grille in the rear, aside from its acoustic value, aids material in ventilation. The openings in the top also assist in ventilation as well as acoustically.

Numerous changes and variations coming within the spirit of my invention may suggest themselves to those skilled in the art, and hence I do not wish to be limited to the specific form shown or uses mentioned, except to the extent indicated in the appended claims, which are to be interpreted as broadly as the state of the art will permit.

I claim:

1. In combination, a cabinet, a radio set in said cabinet comprising a receiving unit and a sound reproducer, said cabinet comprising an integral molded box-like portion open only on one side and a closure plate for said open side, said cabinet being provided with reproducer openings in at least two opposed sides, integral molded grille work extending over said reproducer openings including elongated members for reinforcing the cabinet on opposite sides of and extending in a direction perpendicular to said open side, said receiving unit being mounted in the cabinet in such position that the reproducer is in operative relation to both of said openings so as to emit sound from said openings in a plurality of directions.

2. In combination, a cabinet, a radio set in said cabinet comprising a receiving unit and a sound reproducer, said cabinet comprising an integral molded box-like portion open only on one side and a closure plate for said open side, said cabinet being provided with reproducer openings in at least two opposed sides, integral molded grille work extending over said reproducer openings including ribs on opposite sides of and extending in a direction perpendicular to said open side, said receiving unit being mounted in the cabinet in such position that the reproducer is in operative relation to both of said openings so as to emit sound from said openings in a plurality of directions.

3. In combination, a cabinet, a radio set in said cabinet comprising a receiving unit and a sound reproducer, said cabinet having been molded integrally out of plastic material and comprising front, rear, top and end walls and a base plate secured to said cabinet, said cabinet being provided with reproducer openings in at least two opposed walls, integral molded grille work extending over said reproducer openings including ribs extending in a substantially vertical direction, said receiving unit being mounted in said cabinet in such position that the reproducer is in operative relation to both of said openings so as to emit sound from said openings in a plurality of directions.

4. In combination, a cabinet, a radio set in said cabinet comprising a receiving unit and a sound reproducer, said cabinet comprising an integral molded box-like portion open only on one side and a closure plate for said open side, said cabinet being provided with reproducer openings in at least two opposed sides, integral molded grille work extending over said reproducer openings including ribs on opposite sides of and extending in a direction perpendicular to said open side, said receiving unit being mounted in the cabinet in such position that the reproducer is in operative relation to both of said openings so as to emit sound from said openings in a plurality of directions, and means integrally molded in said box-like portion constructed and arranged to support said receiving unit and sound reproducer.

5. In combination, a cabinet, a radio set in said cabinet comprising a receiving unit and a sound reproducer, said cabinet having been molded integrally out of plastic material and comprising front, rear, top and end walls, and a base plate secured to said cabinet and forming a closure therefor, said cabinet being provided with reproducer openings in the front and rear walls, integral molded grille work extending over said reproducer openings including ribs extending in a substantially vertical direction, said receiving unit being mounted in said cabinet in such position that the reproducer is in operative relation to both of said openings so as to emit sound from said openings in a plurality of directions.

6. In combination, a cabinet, a radio set in said cabinet comprising a receiving unit and a sound reproducer, said cabinet having been molded integrally out of plastic material and comprising front, rear, end walls and a top, and a base plate secured to said cabinet and forming a closure therefor, said cabinet being provided with reproducer openings in at least two opposed walls, integral molded grille work extending over said reproducer openings including a series of ribs integrally molded in the two opposed walls of said cabinet and at least partially encircling the top, the receiving unit being mounted in the cabinet in such position that the reproducer is in operative relation to both of said openings so as to emit sound from the openings in a plurality of directions.

7. In combination, a cabinet, a radio set in said cabinet comprising a receiving unit and a sound reproducer, said cabinet having been molded integrally out of plastic material and comprising front, rear, end walls and a top, and a base plate secured to said cabinet and forming a closure therefor, said cabinet being provided with reproducer openings in at least two opposed walls, integral molded grille work extending over said reproducer openings including a series of ribs integrally molded in said cabinet and starting in one opposed wall, encircling the top and culminating in the other opposed wall, a reinforcing member joining a portion of said ribs integrally molded in the top, the receiving unit being mounted in the cabinet in such a position that the reproducer is in operative relation to both of said openings so as to emit sound from the openings in a plurality of directions.

8. In combination, a cabinet, a radio set in said cabinet comprising a receiving unit and a sound reproducer, said cabinet comprising an integral molded box-like portion open only on one side, said cabinet being provided with reproducer openings in at least two opposed sides, integral molded grille work extending over said reproducer openings including ribs on opposite sides of and extending in a direction perpendicular to said open side, said receiving unit being mounted in said cabinet in such position that the reproducer is in close proximity to one of said openings and in operative relation to the other opening so as to emit sound from both of said openings.

9. In combination, a cabinet, a radio set in said cabinet comprising a receiving unit and a sound reproducer, said cabinet comprising an integral molded box-like portion open only on one side and a closure plate for said open side, said cabinet being provided with reproducer openings in at least two opposed sides, integral molded grille work extending over said reproducer openings including elongated members for reinforcing the cabinet on opposite sides of and extending at least to one edge of its respective sides in a direction perpendicular to said open side, said receiving unit being mounted in the cabinet in such position that the reproducer is in operative relation to both of said openings so as to emit sound from said openings in a plurality of directions.

10. In combination, a cabinet, a radio set in said cabinet comprising a receiving unit and a sound reproducer, said cabinet comprising an integral molded box-like portion open only on one side, said cabinet being provided with openings in at least two opposed sides, integral molded grille work extending over said openings, including ribs on opposite sides of and extending in a direction perpendicular to said open side, said receiving unit being mounted in the cabinet in such position that the reproducer is in operative relation to at least one of said openings, and means including integrally molded means in said boxlike portion constructed and arranged to support said receiving unit and sound reproducer.

11. In combination, a cabinet, a radio set in said cabinet comprising a receiving unit and a sound reproducer, said cabinet comprising an integral molded box-like portion open only on one side and provided with reproducer openings in at least two opposed sides, integral molded grille work extending over said reproducer openings including ribs on opposite sides of and extending in a direction perpendicular to said open side, said receiving unit being mounted in the cabinet in such position that the reproducer is in operative relation to both of said openings so as to emit sound from said openings in a plurality of directions.

12. In combination, a cabinet, a radio set in said cabinet comprising a receiving unit and a sound reproducer, said cabinet having been molded integrally out of plastic material and comprising front, rear, end walls and a top, said cabinet being provided with reproducer openings in at least two opposed walls, integral molded grille work extending over said reproducer openings including a series of ribs integrally molded in said cabinet and starting in one opposed wall, encircling the top and culminating in the other opposed wall, and a reenforcing member integrally molded in the top and joining a portion of said ribs, the receiving unit being mounted in the cabinet in such position that the reproducer is in operative relation to both of said openings so as to emit sound from the openings in a plurality of directions.

ADOLPH J. SNOW.